United States Patent [19]
Hunt

[11] 3,935,382
[45] Jan. 27, 1976

[54] THERMOGRAPH ABSOLUTE TEMPERATURE REFERENCING TECHNIQUE

[75] Inventor: Robert P. Hunt, Menlo Park, Calif.

[73] Assignee: Spectrotherm Corporation, Santa Clara, Calif.

[22] Filed: Mar. 4, 1974

[21] Appl. No.: 447,960

[52] U.S. Cl. ...... 178/7.1; 178/DIG. 8; 178/DIG. 14
[51] Int. Cl.² ............................................. H04N 3/16
[58] Field of Search......... 178/7.1, DIG. 8, DIG. 14, 178/DIG. 39; 250/83.3 H

[56] References Cited
UNITED STATES PATENTS
| | | | |
|---|---|---|---|
| 3,751,586 | 8/1973 | Johansson | 178/DIG. 8 |
| 3,830,970 | 8/1974 | Hurley et al. | 178/DIG. 8 |

*Primary Examiner*—Richard Murray
*Attorney, Agent, or Firm*—Limbach, Limbach & Sutton

[57] ABSTRACT

An infrared imaging system (thermograph) that electronically forms an optical display of an object as viewed in the infrared portion of the spectrum wherein a given brightness level of the optical image may be set to correspond to a particular object temperature. A reference object (target) within the thermograph is periodically imaged simultaneously with the electronic video circuits being reset to a reference voltage proportional to the absolute temperature of the target. Temperature variations of the target during a period use of the thermograph thus does not affect the brightness level of the optical images, and the optical image brightness becomes a measure of the absolute temperature of the optical image.

9 Claims, 4 Drawing Figures

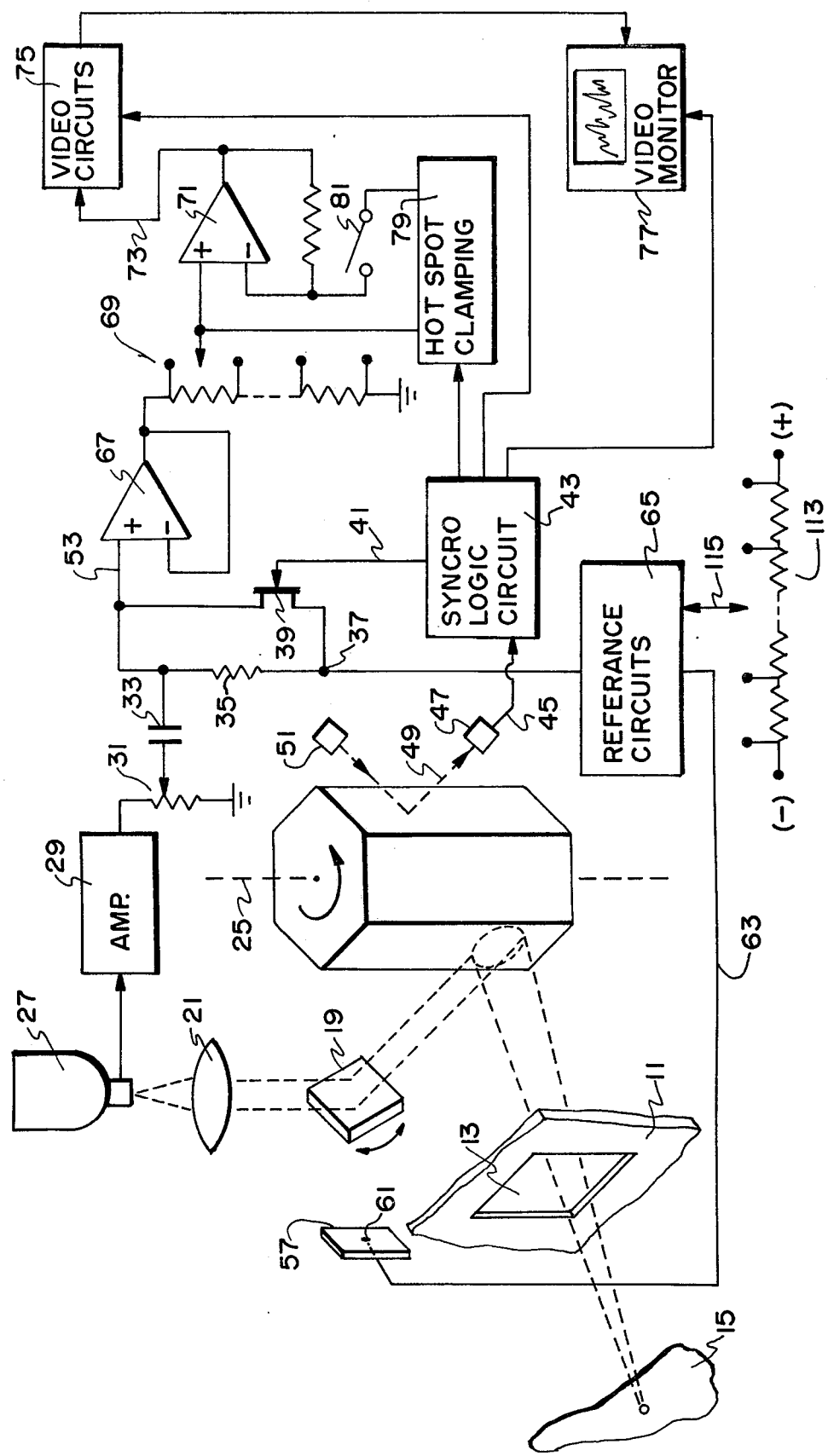

3,935,382

THERMOGRAPH ABSOLUTE TEMPERATURE REFERENCING TECHNIQUE

BACKGROUND OF THE INVENTION

The present invention is an improvement in the infrared scanning system described and claimed in prior U.S. Pat. application Ser. No. 232,015, filed Mar. 6, 1972, now U.S. Pat. No. 3,798,366 issued Mar. 19, 1974. This prior application describes an existing thermograph product of the common assignee of the prior and this application, Spectrotherm Corporation of Santa Clara, Calif.

Such a thermograph instrument utilizes electromechanical optics to scan a two dimensional object (most commonly a human patient under medical diagnosis) across a point infrared sensitive detector. The detector output is a single time varying electrical signal proportional to the infrared intensity variations of the object as it is scanned line by line in a two dimensional raster pattern analogous to that utilized in typical television systems. This electrical signal is then processed and applied to a video monitor. A visual picture is thus reproduced from the processed electronic signal on the face of the video monitor showing light and dark intensity variations of an image of the object corresponding to high and low temperature areas, respectively, of the object being imaged. Such a thermograph device has become widely accepted as a medical diagnostic tool for, among other applications, detecting the existence of cancerous growth below the skin of human patients.

In order to reduce the bandwidth capability required of the video processing circuits and to prevent horizontal shading effects, a reference target is provided within the thermograph that is imaged thereby at the beginning of each line scan across the object. At the same time that the reference target is being imaged, the signal level in the video processing circuits is referenced to a particular voltage, namely ground potential in a specific thermograph instrument. This technique eliminates the necessity of carrying the electronic bandwidth to a very low frequency and serves to overcome some errors introduced into the system by drifting of components, charge accummulation, etc.

This technique is satisfactory to assure that the optical images remain stable for a short period of time but over a longer period of use of the thermograph the temperature of the reference target is likely to slowly rise. Thus, the brightness of the optical image formed on the video monitor for a given object temperature will change over time as the reference target temperature changes. To overcome this, an automatic brightness control is provided as part of the video processing circuitry in the existing thermograph identified above. Such a circuit references the brightness of the reconstructed image points to the brightest point of the object being scanned. This technique is satisfactory in many circumstances but has a disadvantage in others that the cool features of the object may be lost in the very dark portions of the optical image. Furthermore, no absolute comparison of object temperatures is possible from the optical reconstructions themselves since each optical image of a different object will be referenced to a different brightness level depending on the characteristics of that object.

Another thermograph instrument has solved this problem by maintaining its reference target at a constant temperature no matter what is happening to the temperature of the environment or that within the thermograph instrument. Each video picture reconstructed is thus referenced to a common reference temperature detected from the reference target. However, the maintenance of the target at a constant temperature is extremely cumbersome and complex.

Therefore, it is a primary object of the present invention to provide an improved technique for absolute temperature reference in an infrared imaging instrument.

SUMMARY OF THE INVENTION

Briefly, an improvement of the present invention over the existing thermograph instrument as identified above with respect to a prior patent application is the addition of a mechanism for measuring the temperature of the reference target and developing a signal proportional to that temperature, this signal being utilized in the video processing circuits as the reference potential, thereby to compensate for variations in the video signal obtained through the infrared detector when the reference target is being imaged. Thus, variations in the temperature of the reference target during a period of use of the thermograph does not cause artificial brightness variations among optical images formed at different times on the video monitor. An additional control circuit is provided in conjunction with this for setting a bias voltage at the input to the video processing circuits which determines the object temperature which will give a certain optical image brightness, such as, for example, a maximum brightness (white).

Additional objects, advantages and detailed features of the present invention will become apparent from the following description of its preferred embodiment which should be taken in conjunction with the accompanying drawings.

BRIEF DESCRIPTION OF THE DRAWINGS

FIG. 1 is a block diagram of principal elements of a thermograph incorporating the improvement of the present invention;

DESCRIPTION OF A PREFERRED EMBODIMENT

Figure 2A:
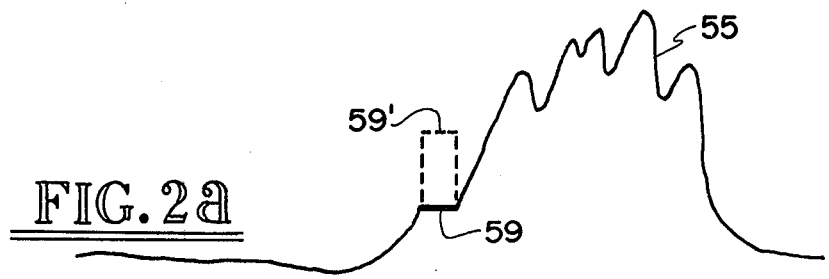
FIGS. 2a and 2b illustrates two voltage waveforms of the circuit of FIG. 1.

Referring to FIG. 1, a front panel 11 of a thermograph instrument has an opening 13 through which an optical system within the thermograph views an object 15 of interest. An electro-optical system including a rotating polygon mirror 17, a rocking mirror 19 and a lens 21 scan a two dimensional area of the object 15 across a point infrared detector 23. The mirror element 17 rotates about an axis 25 at a constant angular velocity and includes a plurality of planar mirrors. The example shown in FIG. 1 includes six such mirrors of the rotating scanner 17 that are connected together to form a symmetrical hexagon in a projection onto a plane perpendicular to its axis 25. The polygon mirror element 17 scans individual horizontal lines of the object while the rocking mirror 19 scans the object image in its vertical direction across the detector 23. For one complete cycle of the rocking mirror 19, the horizontal scanning polygon mirror 17 will scan a large number of individual picture lines, thereby forming at the output of the detector 23 an electronic signal proportional to one frame of image information. The detector 23 is kept cool by attachment to the bottom of a Dewar container 27.

The detector 23 is chosen to be primarily sensitive to the infrared region of the electromagnetic energy spectrum. Since such a thermograph has been described as a primary utility of medical diagnostic work, it is desirable that this sensitivity include electromagnetic radiation emitted from the human body, which is about 10 microns in wavelength. An appropriate detector for this application is a mercury-cadmium-telluride detector that is commercially available. This type of detector is a semiconductor which changes its resistance in proportion to the intensity of infrared radiation incident thereon. These resistance changes are applied as a time varying electrical signal to an amplifier circuit 29 which preferably includes two cascaded amplifiers, the first of which is a carefully shielded pre-amplifier for increasing the weak level of the signal from the detector 23 to a level that is not so sensitive to any noise that may exist in the thermograph instrument. The output of the amplifier stage 29 is adjustable by means of a potentiometer 31.

A coupling capacitor 33 is utilized in series with the potentiometer 31 for coupling the infrared detector signal to subsequent stages. The output of the capacitor 33 is connected through a resistance 35 to a reference potential point 37. This resistance 35 is connected in parallel with an FET switch 39 with a gate control lead 41 whose voltage determines whether the FET switch 39 is held in a conductive or non-conductive state. When in a conductive state, the FET 39 connects the output of the capacitor 33 directly to the reference potential point 37. This occurs at selected times in synchronism with the scanning electro-optical system by synchronizing circuits 43. The circuits 43 include as a primary element a digital counter that is controlled by a clock line 45. A clock pulse in the line 45 is derived from a light detector 47. The light detector 47 receives a light beam 49 reflective from a polygon mirror from a light source 51. The detector 47 and light source 51 are stationary with respect to the axis 25 of the rotating mirror element 17. Therefore, such a pulse is generated in the line 45 once each horizontal line scan of the object by the polygon mirror 17. This pulse is utilized to synchronize the circuits within the block 43 in time relationship with the optical field scanning by the polygon mirror 17.

Referring to FIG. 2a, the voltage waveform existing in the line 53 has a function of time as illustrated. A portion 55 of this voltage waveform illustrates the time during one horizontal line scan that some portion of the object 15 is being imaged onto the detector 23. Because of the limited field of view of the thermograph illustrated in FIG. 1, the electronic system is performing its imaging function for only about 25% of the time. Immediately preceding the scanning of the object 15 in one line thereacross by one of the mirrors of the assembly 17, that same mirror scans a reference temperature target 57 and projects an image of the target (although not necessarily in focus) onto the detector 23. The signal in the line 53 developed from scanning across the reference target 57 is illustrated in the portion 59 of the signal of FIG. 2a. For the remainder of the time period for a single horizontal line scan signal as represented by FIG. 2a, a given one of the planar mirrors on the side of the polygon mirror assembly 17 is scanning the inside of the thermograph instrument. This extraneous information is deleted by video processing circuits (not shown) from that information used in forming the optical image. One horizontal line scan signal is illustrated in FIG. 2a. Other horizontal lines are repetitively scanned across the object 15.

Figure 2B:
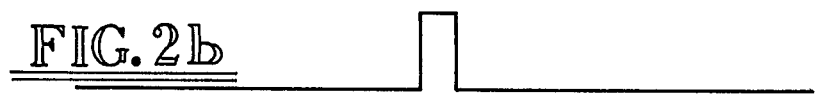

The pulse waveform of FIG. 2b illustrates the timing of a pulse in the line 41 with respect to the information signal of FIG. 2a. When the pulse of FIG. 2b occurs in the line 41 (FIG. 1), the FET switch 39 is closed and the resistance 35 is thus substantially shorted out. For the duration of the pulse of FIG. 2b, therefore, the line 53 is connected to the reference potential point 37. Therefore, for the duration of the pulse of FIG. 2b the voltage across the capacitor 33 is related to the difference in the signal generated as proportional to the temperature of the reference target 57 and the reference potential at the point 37. In order that this charge voltage is independent of the absolute temperature of the reference bar 57, its temperature is monitored by a thermistor 61 physically connected therewith. The thermistor 61 is electrically connected by a line 63 to reference circuits illustrated by a block 65. The output of the reference circuits 65 is the voltage level at the point 37. The reference circuits 65 cause the voltage at the reference point 37 to increase by the same amount per degree change in temperature of the reference bar 57 as appears in the line 53 from the detector 23 when viewing the reference target 57. Thus, the voltage across the capacitor 33 is independent of any temperature variations of the reference target 57 when the reference target 57 is being viewed.

The capacitor 33 is given a residual charge each scanning line interval when the reference target 57 is being imaged onto the detector 23. The subsequent picture information 55 (FIG. 2a) as a line of the object is scanned is thus affected (biased) by the reference voltage held by the capacitor 33. This picture signal in the line 53 is passed through a buffer amplifier 67 of unity gain and then to a sensitivity control 69 in the form of a selective voltage divider. The output of the control 69 is applied to a non-inverting input of an operational amplifier 71 with the amplified output being applied in a line 73 to a video processing electronic circuit 75. The signal output of the circuit block 75 is applied to a video monitor 77 for presentation of an optical image of the object 15 as viewed in infrared energy. This image is either viewed directly or photographed for a permanent record. Detailed circuits and techniques utilized in the blocks 75 and 77 may be had by reference to the aforementioned prior patent application. Additionally, an automatic brightness control circuit 79 may also be utilized with an input from the output of the sensitivity control 69 and an output applied through a switch 81 to an inverting input of the amplifier 71. This automatic brightness control circuit 79 may be the same as that disclosed in FIG. 4 of the aforementioned prior patent application. When the switch 81 is closed, the brightness control 79 references a picture information signal in the line 73 to the brightest spot of the prior frame image, as described in detail in the aforementioned patent application. Alternatively, the automatic brightness control circuit 79 may be omitted from the thermograph shown in FIG. 1.

Figure 3:
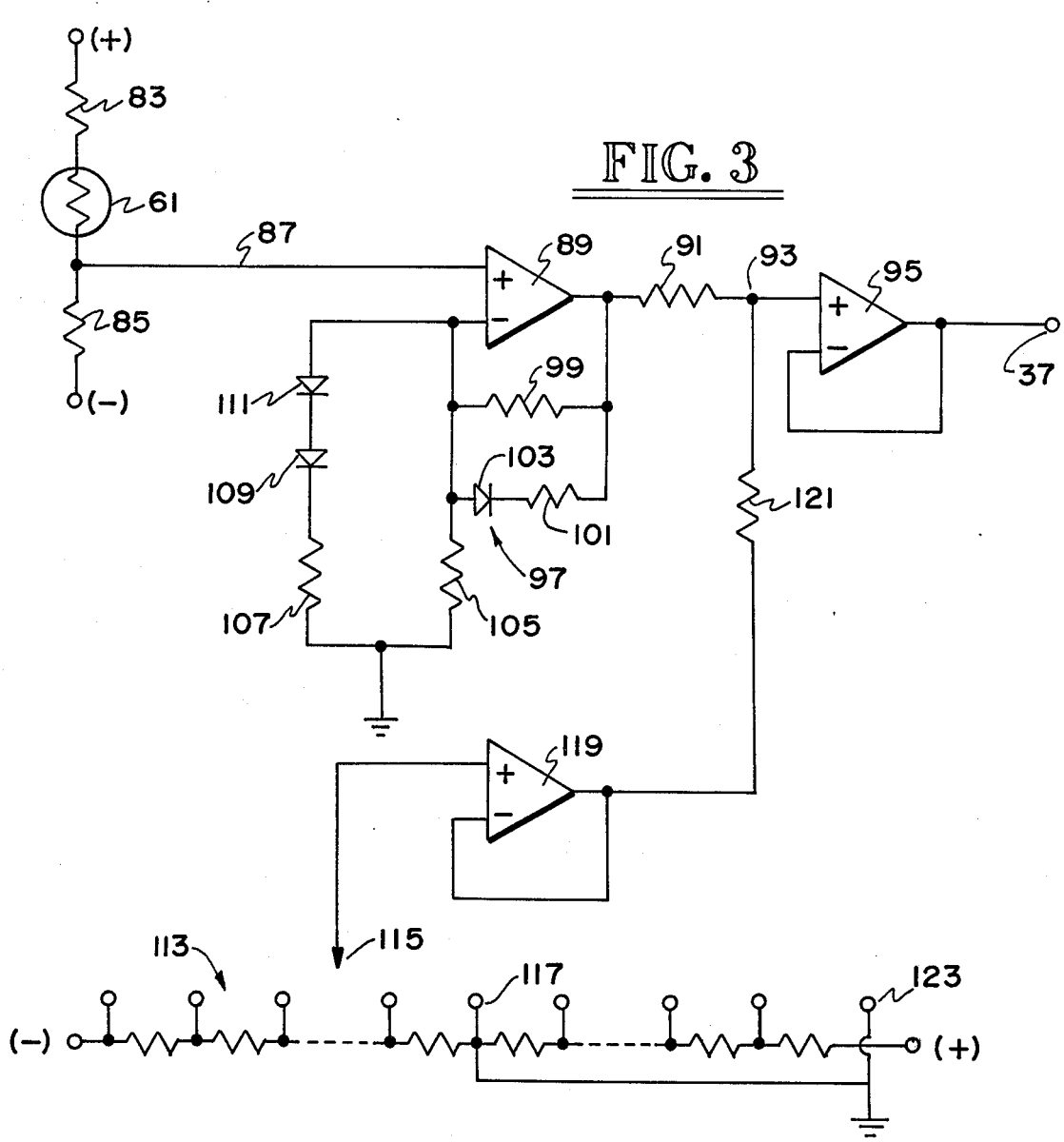
FIG. 3 is a detailed circuit diagram of a block of FIG. 1.

Reference target 57 is preferably made of aluminum with its thermistor 61 imbedded near the middle thereof. Referring to FIG. 3, a schematic diagram showing the connection of the thermistor 61 with the circuits of the block 65 of FIG. 1 is illustrated. The thermistor 61 is placed in series with resistances 83 and 85 across a potential difference. Therefore, the temperature changes detected by the thermistor 61 cause voltage variations in a line 87 which is connected to a non-inverting input of an operational amplifier 89. The output of the amplifier 89 is passed through a series resistance 91 to a summing junction 93. The summing junction 93 is connected to the non-inverting input of an operational amplifier 95 that is connected with its output directly to an inverting input of the amplifier, thereby giving a unity gain buffer amplifier circuit. The output of the amplifier 95 is connected directly to the reference potential point 37 of FIG. 1.

A feedback circuit of the amplifier 89 between its output and its inverting input is made to include passive electrical elements having a non-linear characteristic to compensate for the non-linear characteristics of the thermistor 61. That is, a feedback circuit 97 of the amplifier 89 is chosen so that the output of the amplifier 89 is a voltage that varies linearly as the temperature to which the thermistor 61 is subjected.

The feedback network 97 includes a resistor 99 that is permanently connected between the output and the inverting input of the amplifier 89. In parallel with the resistor 99 is a series combination of another resistance 101 and a diode 103. The diode 103 effectively connects the resistance 101 into the circuit at low voltages in the line 87 to reduce the gain of the amplifier 89 at these low voltages. Similarly, a resistance 105 is connected between the inverting input of the amplifier 89 and ground potential in a permanent manner. In parallel therewith is a resistance 107 that is connected in series with two diodes 109 and 111. The diodes 109 and 111 connect the resistance 107 into the circuit at high voltage levels in the input line 87 thereby to increase the amplifier gain at such high levels. In this manner, the high and low voltage ends of the thermistor characteristic curve are compensated.

A plurality of resistors are connected in series to form a manually operable voltage divider 113 connected at one end to a negative voltage supply and another end to a positive voltage supply. A switch selecting arm 115 may be connected to a metal terminal 117 that is maintained at ground potential or may be connected to any of the other terminals that are maintained at various precise voltages displaced from ground potential. The voltage selected by the switch arm 115 is directed through a buffer amplifier 119 of unity gain and then through a series resistance 121 to the summing junction 93. This manual adjustment provides a selectable biasing level which moves the signal from the detector 23 that is in the line 53 up and down with respect to a "window" of the video circuits 75. For example, the lowest temperature of the object 15 which will give the brightest reconstruction of the optical image on the video monitor 77 is set by the switch 115. Every object that is imaged for a given setting of the switch 115 will cause the respective image brightness image area for all object points that are the same temperature to be the same. The magnitude of the reference temperature selected by the switch 115 is displayed by a LED device (not shown) located on the video monitor in a position to be viewed or photographed along with the optical image.

Referring to FIG. 2a, the effect upon the signal in the line 53 is also shown that results from an increase of the temperature of the reference target 57. The signal 59' shows the effect of the reference target 57 increasing its temperature above that temperature resulting in the signal level 59. Because of the temperature reference techniques herein, such a variation in the reference target temperature does not affect the rest of the FIG. 2a signal.

It will be noted that two parallel signal paths exist in a feed-forward servo during the interval that the switch 39 is turned on and the point 37 is thus a summing junction combining the outputs of the two paths. One path starts with the detector 23 and the other path with the thermistor 61, both of which measure the temperature of the target 57 during the interval that the switch 39 is conductive and produce temperature proportional voltages that are combined at the summing junction 37.

When the automatic brightness control 79 of FIG. 1 is utilized by closing the switch 81, the selector 115 is also moved to a position 123 at one end of the voltage divider. This connects the non-inverting input of the amplifier 119 to ground potential and thus permits the circuits in the block 79 (FIG. 1) to set the reference voltage level automatically from the brightest point of an image constructed during the last video frame, as described above and in the aforementioned prior application. It is preferred that the switch 81 and the wiper 115 be mechanically "ganged" so that the wiper 115 is connected to the terminal 123 simultaneously with the switch 81 being closed. In any other position of the wiper 115, the switch 81 should be opened to thus disconnect the automatic brightness control circuit block 79 from the circuit.

Specific parameters of the absolute temperature measurement control circuits described will now be outlined as one specific example. The thermistor 61 that is chosen is part number UUA 35J1 manufactured by the Fenwal Electronics, Inc., Framingham, Mass. The components in the feedback circuit 97 of FIG. 3 are chosen so the amplification of the amplifier 89 is about two. In any event, it is desired that the contribution of the output of the amplifier 89 to the voltage at the summing junction 93 be 0.2 volts per degree centigrade (°C). Each of the steps of the voltage divider 113 is made to be 0.2°C, thereby providing a step of 1°C change in reference temperature between steps of the voltage divider 113. The amplifier circuits 29 and the other components associated with the infrared detector 23 are adjusted so that the voltage in the output line 53 also changes at the same incremental rate of 0.2 volts/°C. The voltage divider resistance 31 is manually adjusted so that 0 volts exists at an absolute temperature being monitored by the detector 23 of 25°C. Thus, the manually selected base temperature is 25°C when the wiper 115 is connected to the middle grounded position 117 of the voltage divider 113 (FIG. 3). In the specific example being described, the video circuits 75 operate over a "window" of from zero volts to 0.8 volts of the input signal at the line 73. Only that part of the signal in the line 73 within this window will be displayed with varying intensity depending upon the voltage. Any signal level outside of the window will be displayed as either black or white depending upon whether the signal voltage is below zero volts or above 0.8 volts, respectively. Thus, the manual selection by movement of the switch 115 permits a thermograph operator to select the temperature of the object 15 corresponding to the zero volt value of the input "window" to the video monitor 75 as the darkest portion of a representation of the object 15. Any areas of the object 15 above this temperature will show a brighter portion of the image.

In this specific embodiment, certain component values may be stated. The diodes 103, 109 and 111 of FIG. 3 are each type 1N914. The FET switch 39 of FIG. 1 is a type 2N5653 and the resistance 35 is given a value of 470K ohms. Each of the summing resistances 91 and 121 of FIG. 3 are 1000 ohms each. The resistance 99, 101, 105 and 107 of FIG. 3 are 15K ohms, 38.2K ohms, 4.99K ohms and 9.31K ohms, respectively.

Although the various aspects of the present invention have been described with respect to a preferred embodiment thereof, it will be understood that the invention is entitled to protection within the full scope of the appended claims.

I claim:

1. In a thermograph instrument that is characterized by a reference temperature target adjacent an optical field to be viewed, means for scanning and detecting an infrared energy component of the optical field in two dimensions with a portion of the reference target periodically being scanned and detected thereby, electronic video processing circuits receiving a time varying output of said detector means that is proportional to the infrared intensity of the optical field, and means synchronized with said scanning and detecting means for referencing a portion of said video processing circuits to a reference potential simultaneously with said reference target being scanned and detected, the improvement comprising means independent of said scanning and detecting means and responsive to the absolute temperature of said reference target for developing said reference potential proportional to the target absolute temperature.

2. The improved thermograph instrument of claim 1 wherein said improvement additionally comprises means including a manual adjustment for setting a biasing voltage component to said reference potential, whereby said referenced potential is set both by the temperature of the target and the manual adjustment.

3. The improved thermograph instrument of claim 1 wherein the video signal level appearing from the detecting means at the periodically referenced portion of the video circuits changes the same amount per unit temperature change of the reference target when viewed by the scanning and detecting means as does the reference potential.

4. In a thermograph instrument that is characterized by a reference temperature target adjacent an optical field to be viewed, means for scanning and detecting an infrared energy component of an optical field in two dimensions with a portion of the reference target periodically being scanned and detected thereby, electronic video processing circuits receiving a time varying output of said detector means that is proportional to the infrared intensity of the optical field, a pre-amplifier receiving the output of said detecting means and forming an amplified version thereof at its output, a capacitor coupled at one side thereof to the output of said pre-amplifier, and means synchronized with said scanning and detecting means for referencing a portion of said video processing circuits to a reference potential simultaneously with said reference target being scanned and detected, said reference potential connectable to an opposite side of said coupling capacitor at times when said reference temperature target is being imaged onto said detector, the improvement comprising means including a thermistor physically attached to said reference temperature target for developing said reference potential that is proportional to the temperature of said reference target.

5. In a thermograph instrument that is characterized by a reference temperature target adjacent an optical field to be viewed, means for scanning and detecting an infrared energy component of an optical field in two dimensions with a portion of the reference target periodically being scanned and detected thereby, electronic video processing circuits receiving a time varying output of said detector means that is proportional to the infrared intensity of the optical field, means synchronized with said scanning and detecting means for referencing a portion of said video processing circuits to a reference potential simultaneously with said reference target being scanned and detected, the improvement comprising means including a thermistor physically attached to said reference target and electrically connected to develop a signal non-linearly proportional in level to the target temperature, and means receiving said thermistor signal for compensating for the thermistor nonlinearity to form an output signal substantially linearly proportional to the temperature of said reference target, said output signal thereby setting said reference potential.

6. An apparatus for electronically clamping an infrared sensitive video system, comprising:
an infrared sensitive detector,
a reference temperature target,
means for alternately scanning an object and said target in a two dimensional line raster pattern with said detector in order to develop a time varying electronic signal thereof,
means independent of said detector for measuring the absolute temperature of said reference target and producing a voltage proportional thereto, and
means receiving both said time varying electronic signal and the reference target temperature voltage for electronically summing them, whereby a resulting summation voltage signal contains object information from detector that is unaffected by temperature variation of the reference target.

7. The apparatus of claim 6 wherein said reference target temperature measuring means includes a temperature transducer physically attached to said reference target.

8. The apparatus of claim 6 wherein all of said detector, target, scanning means, measuring means and summing means are contained within a single instrument case.

9. The apparatus of claim 6 wherein said reference target temperature measuring and voltage proportional means includes means compensating an electrical signal developed by the target temperature measuring means in a manner that said voltage proportional to the target temperature varies at said summing means at the same rate per unit change in target temperature as does said time varying electronic signal from said detector at said summing means.

* * * * *